(12) United States Patent
Quan et al.

(10) Patent No.: US 7,719,224 B2
(45) Date of Patent: May 18, 2010

(54) SIMULATED ENCODER PULSE OUTPUT SYSTEM AND METHOD

(75) Inventors: Juntao Quan, Ebikon (CH); Adrian Wirth, Bucharain (CH)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 360 days.

(21) Appl. No.: 11/863,752

(22) Filed: Sep. 28, 2007

(65) Prior Publication Data

US 2009/0085507 A1 Apr. 2, 2009

(51) Int. Cl.
G05B 19/29 (2006.01)

(52) U.S. Cl. ............... 318/601; 318/602; 318/603; 318/625; 318/560

(58) Field of Classification Search ............ 318/601, 318/602, 603, 625, 626, 632, 638, 560
See application file for complete search history.

(56) References Cited

U.S. PATENT DOCUMENTS

| | | | |
|---|---|---|---|
| 6,082,724 A | 7/2000 | Kahlig et al. | |
| 6,302,506 B1 | 10/2001 | Norton | |
| 6,756,760 B2 * | 6/2004 | Tanaka et al. | 318/560 |
| 6,757,583 B2 * | 6/2004 | Giamona et al. | 700/189 |
| 6,956,339 B1 * | 10/2005 | Kureck et al. | 318/85 |
| 7,106,020 B1 | 9/2006 | McMillan | |
| 7,148,635 B1 * | 12/2006 | Piefer et al. | 318/85 |
| 7,456,599 B2 * | 11/2008 | Piefer et al. | 318/625 |

FOREIGN PATENT DOCUMENTS

| | | |
|---|---|---|
| DE | 19727824 | 11/1998 |
| EP | 1341311 | 9/2003 |

OTHER PUBLICATIONS

DIAX04; Drive With Servo Function, Analog-And Parallelinterface; Version Notes: ASE 02VRS; available at http://www.boschrexroth.com/country_units/america/united_states/en/products/brc/ProductDocumentation/CurrentProducts/Drives/HDS/Firmware/ASE/ASE02/ASE02_FVN1.pdf, Date: Jul. 1998.

* cited by examiner

*Primary Examiner*—Bentsu Ro
*Assistant Examiner*—Thai Dinh
(74) *Attorney, Agent, or Firm*—Fletcher Yoder LLP; Alexander R. Kuszewski; John M. Miller (57) ABSTRACT

The invention includes a system and method for generating simulated encoder outputs in a control system. An output pulse width between reference position inputs is computed, the output pulse width being based upon a difference between an updated reference position input and a previous reference position input, and upon a time interval between the reference position inputs. Next, a plurality of simulated encoder pulses is output between updates of the reference position input based upon the computed output pulse width. The output pulse is thereafter adjusted in a closed loop manner between updates of the reference position input.

15 Claims, 6 Drawing Sheets

SIMULATED ENCODER PULSE OUTPUT SYSTEM AND METHOD

BACKGROUND

The invention relates generally to motor control involving a plurality of synchronized motors. More particularly, the invention relates to a technique for high accuracy simulation of an incremental encoder pulse output when an incremental encoder is not available or a fully digital encoder is in use.

Certain applications of motor control require precisely monitoring the position of a motor as it revolves. For example, synchronizing a plurality of motors in systems of conveyers, rolling or drawing mills, printing presses and so forth may require that all motors maintain the same relative angular position and velocity. The position of each motor is typically tracked using an incremental encoder. A primary motor drive, or master, provides a master incremental encoder signal signifying the position of a master motor to the remaining motor drives, or slaves. The slave motor drives synchronize to the master by maintaining the same relative angular position as indicated by the incremental encoder from the master motor drive.

One common form of incremental encoder, known as a sine/cosine encoder, assesses motor position by scanning optical markings on a disk rotating with the load of the motor. The encoder generates a two-channel output consisting of sine and cosine waves. After discretely sampling the two-channel sine and cosine output waves, interpolation techniques may be employed to achieve an increase in position resolution of several orders of magnitude. Often, each of the sampled sine and cosine waves is converted into a square wave corresponding to the high resolution interpolation. In addition to the two square wave signals, known as A and B, or alternatively, A quad B, a sine/cosine incremental encoder may also output a short periodic pulse, known as Z, to signify the start of each motor revolution. To determine precise incremental position and/or velocity, a device may count the edges of the square waves, deriving a digital representation of motor position from the A, B, and/or Z encoder pulse output signals.

Alternatively, another form of incremental encoder known as a virtual encoder may determine motor position entirely in software. Rather than obtain an incremental position based on direct observation of motor rotation, a virtual encoder determines motor position based on the control signals sent to the motor. For example, when a ramp generator sends a reference velocity signal to a motor, a virtual encoder may use the reference velocity signal, in combination with a preset number of pulses per revolution (e.g., 2048 or 4096), to output a digital reference position signal. The digital reference position signal is equivalent to an edge marking count of a conventional sine/cosine incremental encoder pulse output.

Because most modern motor drives utilize digital control circuitry, and a virtual encoder may be implemented in software, a virtual encoder is frequently preferred to a sine/cosine incremental encoder. However, not all equipment may be configured to use a digital incremental position signal. Some equipment, particularly older equipment, may require an incremental encoder pulse output signal (A, B, and/or Z). Accordingly, systems employing such equipment may require at least one sine/cosine incremental encoder to provide the necessary encoder pulse output signals, though a virtual encoder alone may be preferred.

Certain modes of operation may further preclude a sine/cosine incremental encoder from outputting an encoder pulse output signal. For example, it may be desirable to turn off one motor in a system of synchronized motors, but continue to use certain other equipment as if that motor remained on and synchronized. Multi-color printing applications may benefit from such a mode of operation. A multi-color printing press may employ four single-color printing stations, each supported by additional process control equipment to ensure proper paper position. When printing in only three colors, only three printing stations may be active, but process control equipment from all four print stations may be needed. For such an application, a conventional sine/cosine incremental encoder assigned to the inactive motor would not output an encoder pulse output, as the physical position of the motor would not change. However, a virtual master encoder could provide a digital position signal representing what position the motor would have as if the motor were active. If the additional supporting equipment required encoder pulse output signals, rather than only a digital reference position signal, such an application would be impossible without an alternative means of obtaining an encoder pulse output signal.

Though attempts have been made to work around the existing problem, such efforts have failed to produce a high accuracy encoder pulse output signal from a digital position signal without unnecessary jitter or delay. Moreover, such efforts may also temporarily result in excessive position error.

BRIEF DESCRIPTION

The invention includes a system and method for generating simulated encoder outputs in a control system. In accordance with one aspect of the present invention, a current fine interpolated position is estimated based a difference between an updated reference position and a previous reference position. At least a portion of the output pulse width is calculated after comparing the fine interpolated position to the position indicated by a current encoder pulse output. A plurality of simulated encoder pulses is output based on the calculated portion of the output pulse width, and the output pulse is adjusted in a closed loop manner between updates of the reference position input.

In accordance with another aspect of the invention, a system of synchronized motors includes a master motor drive configured to provide a digital master encoder signal and to provide a simulated incremental position pulse train signal based on the digital master encoder signal. Though a slave motor drive may be configured to receive the digital master encoder signal, an additional process control element is configured to receive the incremental position pulse train signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
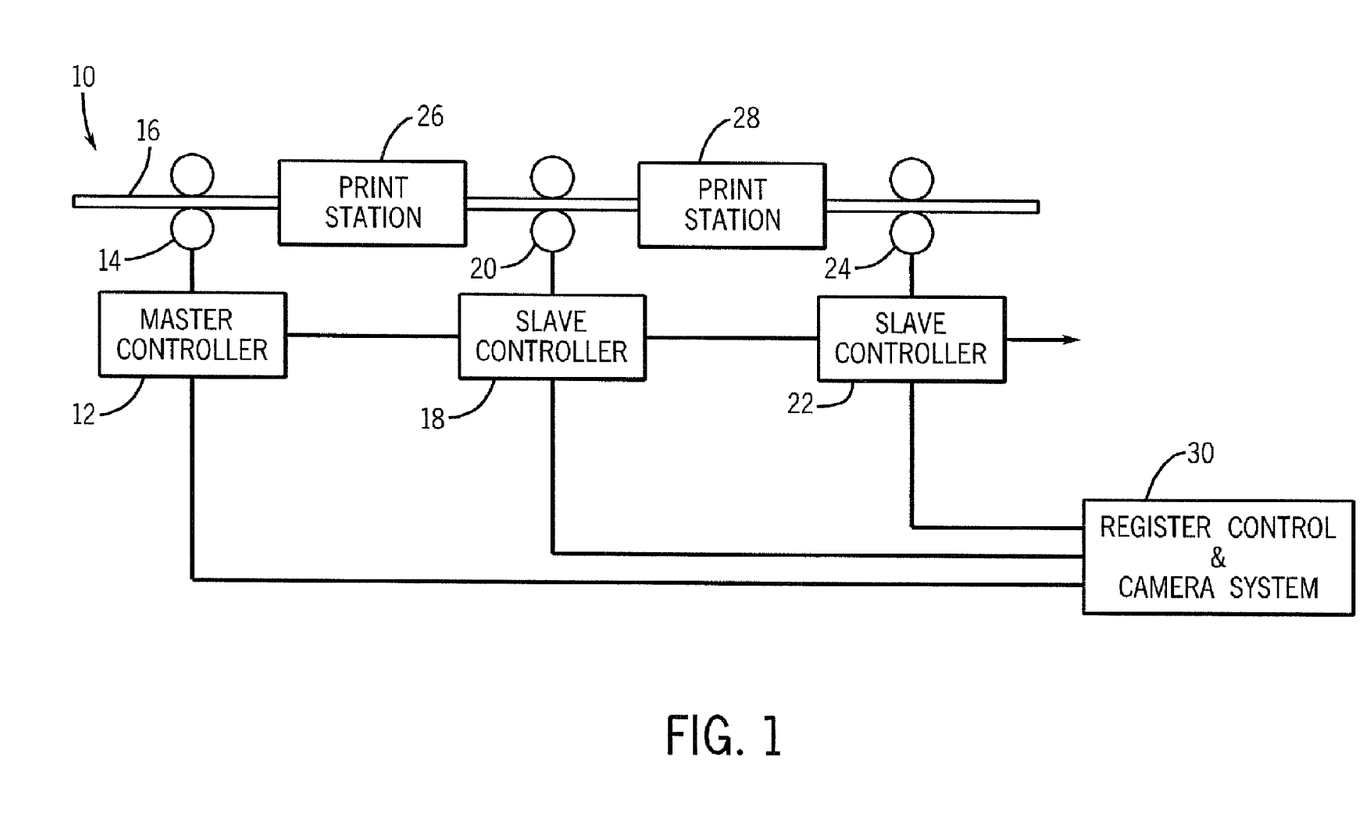
FIG. 1 is a diagrammatical overview of an exemplary system of synchronized motors employing an encoder technique in accordance with aspects of the invention.

Referring to FIG. 1, an exemplary system of synchronized motors takes the form of printing press 10, representing only one of many applications which may practice electronic motor and process synchronization. A master controller 12 drives a master motor 14, which causes rollers to move a web of paper 16 through the printing press 10. A first slave controller 18 receives a digital signal indicating the position and velocity of the master motor 14 from master controller 12, with which the first slave controller 18 may drive slave motor 20 to match the position and velocity of master motor 14. Synchronized, master motor 14 and first slave motor 20 cause rollers to move the web of paper 16 uniformly through the printing press.

In the printing press example of FIG. 1, because the synchronized system of motors employs electronic signals for synchronization rather than a mechanical line shaft, the exemplary system may be described as synchronizing with an "electronic line shaft." To synchronize additional motors, the digital position and velocity signals of master motor 14 continue through the "electronic line shaft." First slave controller 18 passes the digital position and velocity signals of master motor 14 to a second slave controller 22, which may then drive slave motor 24 to match master motor 14. Accordingly, all motor controllers connected via the "electronic line shaft" may drive motors to maintain uniform (or coordinated) position and velocity. Though exemplary printing press 10 synchronizes motors with digital signals, some embodiments may synchronize slave motors to a master motor with only an electronic motor position signal or a motor velocity signal, and the signal may alternatively be an analog signal or a discrete, non-digital signal.

Referring still to FIG. 1, master motor 14, first slave motor 20, and second slave motor 24 move the web of paper 16 synchronously through a plurality of print stations 26 and 28. A given print station may perform one of many operations, such as printing a particular color of a multi-color printing process or cutting, binding, or folding the paper.

As the web of paper 16 moves through the printing press, the paper may stretch or become misaligned. Print stations 26 and 28 account for paper movement with assistance from a register control and camera system 30. By comparing position data gained through simulated incremental encoder pulse output signals from the master controller 12, slave controller 18, and/or slave controller 22, with its own observations of the paper position, the register control and camera system 30 may ascertain whether and how the paper has stretched or moved out of alignment. The alignment data developed by register control and camera system 30 passes to each active print station, which then adjusts its operations to accommodate paper movement.

Figure 2:
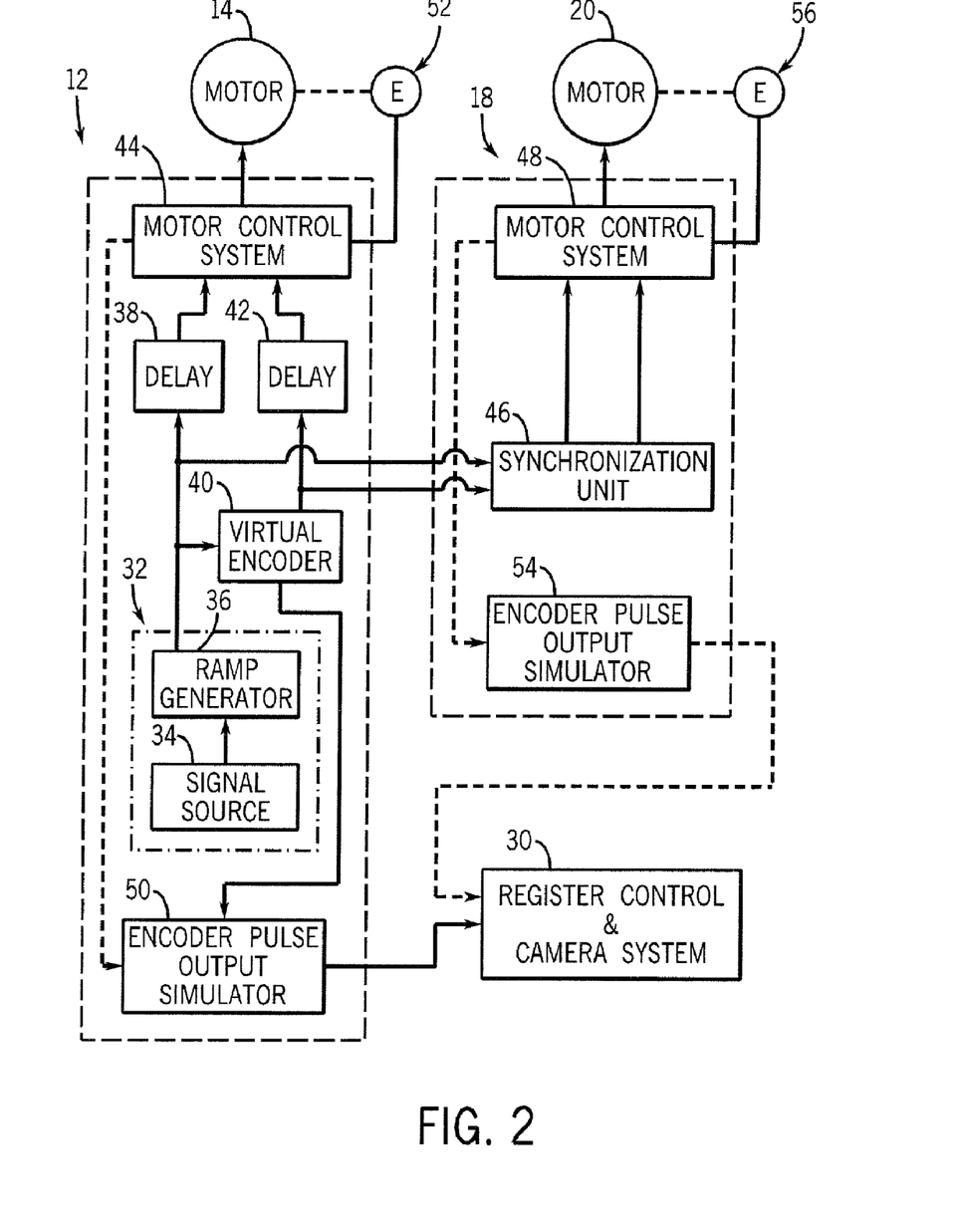
FIG. 2 is a block diagram representing a master motor drive and slave motor drive in the exemplary system of FIG. 1.

FIG. 2 offers a more detailed diagrammatical view of master motor drive 12 and slave motor drive 18 in the exemplary system of synchronized motors. As described above, master motor controller 12 drives master motor 14 and slave motor 18 drives slave motor 20. Though master motor controller 12 and slave motor drive 18 are depicted with different components, each motor controller will typically contain all the same components, but through programming components and functions for each motor controller may be switched on or off, or adjusted accordingly.

The operation of master motor controller 12 begins at signal generator 32, which comprises a signal source 34 and ramp generator 36. Signal generator 32 reads in a motor velocity command signal through signal source 34, which may be configured, for example, to receive the signal through a man-machine interface for manual command entry, located remotely or at the physical location of the master motor controller 12, or alternatively to receive the signal automatically from an automated control system. To prevent abrupt changes in motor velocity that could damage motor components, ramp generator 36 outputs reference velocity signals which gradually raise or lower the motor velocity in response to motor velocity command signals received from signal source 34.

Continuing with master motor controller 12 of FIG. 2, motor velocity reference signals from ramp generator 36 feed into delay element 38 and to virtual encoder 40. Delay element 38 delays the velocity reference signal for an amount of time sufficient for the signal to propagate to the remaining slave motor drives. The virtual encoder 40 is typically programmed in the firmware of master motor controller 12 and may be referred to as the virtual master encoder, using the motor velocity reference signals to determine a digital motor position reference signal. Based on a constant scale factor of a preset number of pulses per revolution, or the total number of increments that would constitute one full motor revolution on a physical encoder (e.g., 2048 or 4096), the virtual encoder 40 integrates the reference velocity signal to obtain a reference position signal. The reference position signal represents a virtual digital equivalent of an integer position edge marking count that would originate from a physical incremental encoder.

Delay element 42 reads in the motor position reference signal from virtual encoder 40. Like delay element 38, delay element 42 delays the signal an appropriate amount of time for the signal to propagate to all slave motor controllers. Motor control system 44 provides motor 14 with a proper torque signal in response to the motor velocity reference signal and motor position reference signal. While the delay elements 38 and 42 delay the arrival of the motor velocity reference signal and motor position reference signal, the signals pass to a synchronization unit 46, located within motor controller 18. The synchronization unit 46 generates a timing signal from the motor velocity and position reference signals received from master motor controller 12. Sending the timing signal to motor control system 48, the synchronization unit 46 allows motor control system 48 to make proper control adjustments to slave motor 20 so as to synchronize with master motor 14.

As previously discussed, register control and camera system 30 assists with print process control as the web of paper 16 (depicted in FIG. 1) stretches and shifts out of alignment while moving through the system. Cameras from the register control and camera system 30 take a series of images at specific moments, with which the system may monitor the precise location of special marks on the paper in determining the current paper alignment, feeding the information back to print stations 26 and 28 (depicted in FIG. 1). Operation of the register control and camera system 30 for synchronization of print stations 26 and 28 depend on a strobe signal defined by encoder pulse output signals A, B, and Z, which are provided by encoder pulse output simulator 50.

Encoder pulse output simulator 50 generates an incremental encoder pulse output based on digital reference position signals from virtual encoder 40 or, optionally, from a physical encoder 52 that provides only pure digital serial reference position signals. The digital serial reference position signals from physical encoder 52 pass directly to encoder pulse output simulator or via motor control system 44. An alternative or additional encoder pulse output simulator 54 may similarly provide encoder pulse output signals to register control and camera system 30. If used, encoder pulse output simulator 54 would generate an incremental encoder pulse output based on digital serial position reference signals from physical encoder 56, received directly or via motor control system 48.

Figure 3:
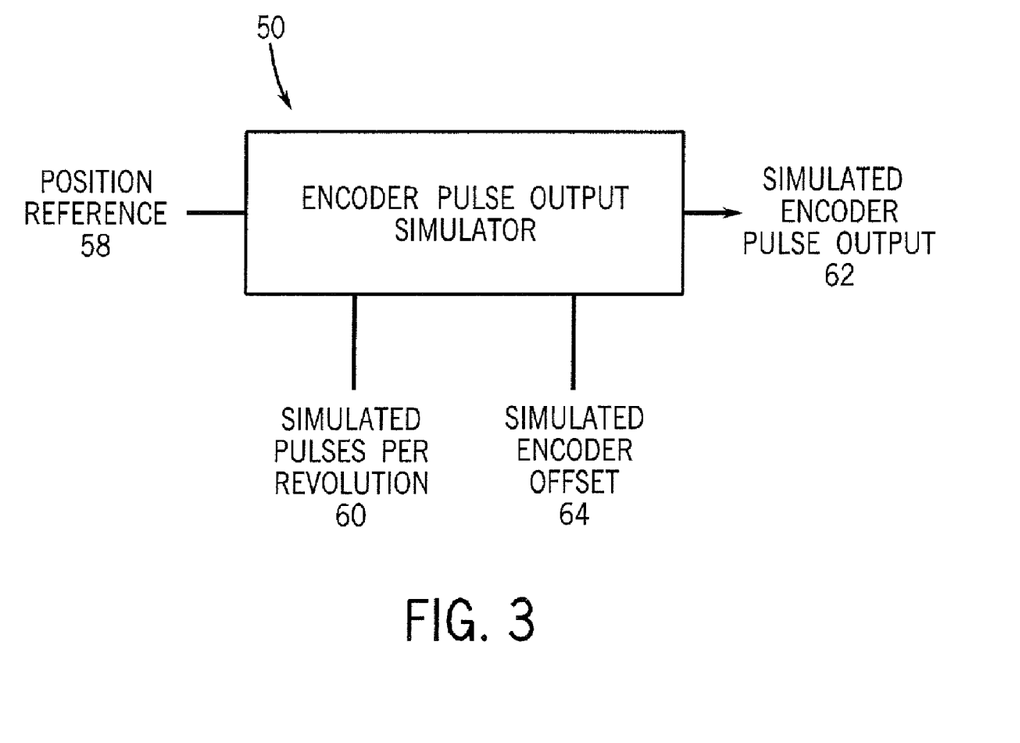
FIG. 3 is a diagrammatical overview of an exemplary encoder pulse output simulator module in accordance with an embodiment of the invention.

FIG. 3 provides a closer view of encoder pulse output simulator 50, which may be implemented, for example, using a field programmable gate array (FPGA) or in firmware. Though encoder pulse output simulator 50 may be implemented using a microprocessor, an FPGA may much more rapidly carry out a comparatively small number of logical functions, providing a more effective means for immediate closed-loop feedback correction in the encoder pulse output simulator 50.

After reading in a signal for position reference 58 and a user-defined value defining simulated pulses per revolution 60, simulated encoder pulse output 62, representing A, B, and Z encoder output signals, results. Encoder pulse output simulator 50 checks position reference 58 at regular intervals, which comprises a digital value representing incremental position. The user-defined value for simulated pulses per revolution 60 represents the number of fixed position increments to make up one motor revolution. Simulated pulses per revolution 60 may be any number $2^n$, where n represents an integer greater than zero, such as 1024 or 2048. To account for variations in the movement of web of paper 16 (depicted in FIG. 1), encoder pulse output simulator 50 may additionally read in a simulated encoder offset 64. The simulated encoder offset 64 sets the Z pulse (of the A, B, and Z encoder output signals) as necessary.

Figure 4:
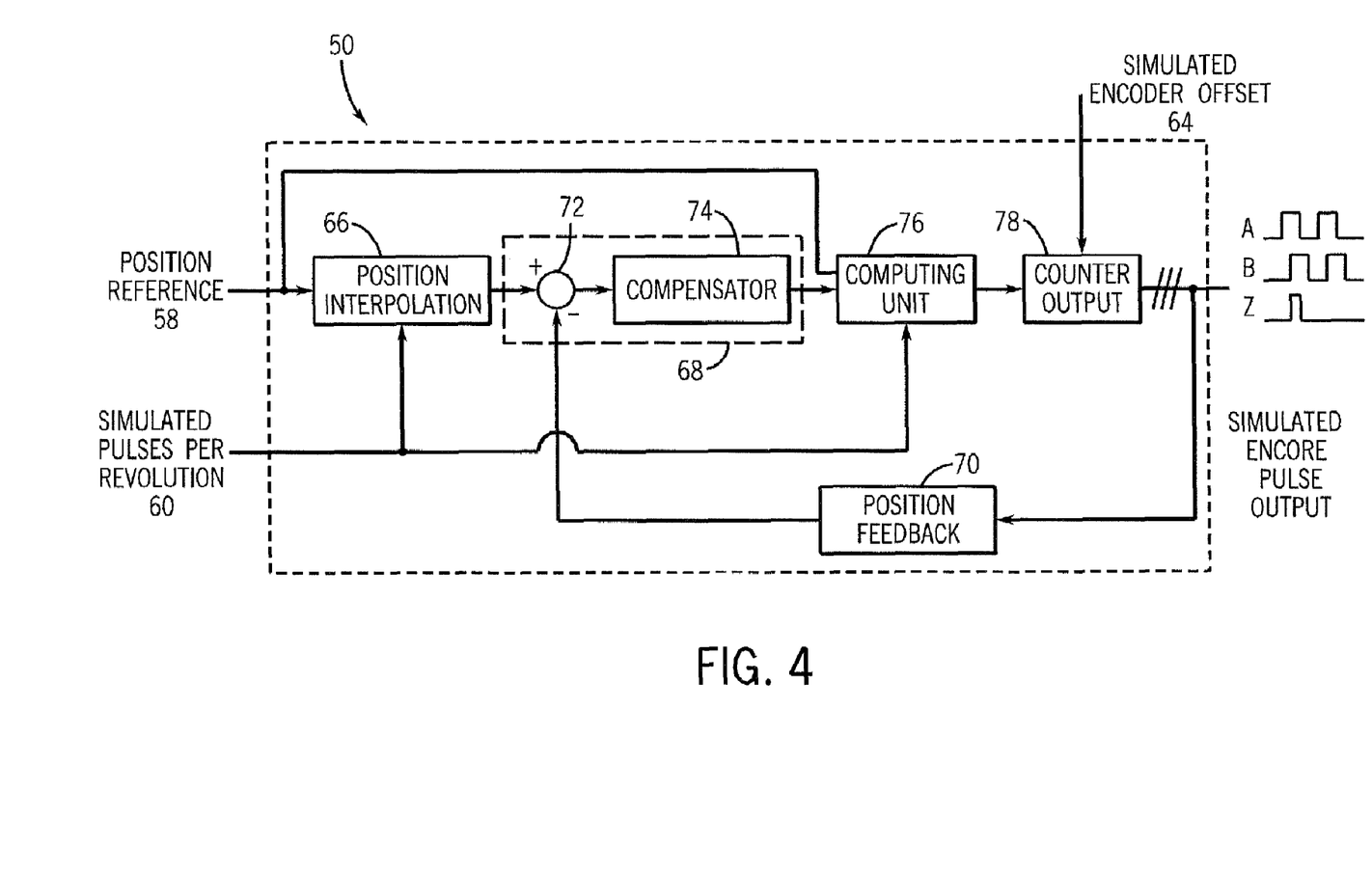
FIG. 4 is a detailed diagram representing an exemplary encoder pulse output simulator module.

Turning to FIG. 4, a block diagram illustrates in greater detail the operation of encoder pulse output simulator 50. With position reference 58 and user-defined parameter simulated pulses per revolution 60 as inputs, position interpolation module 66 determines a high-resolution incremental position of the motor. As discussed above, position reference 58 provides a digital representation of the master motor 14 incremental position. To determine a current motor position, position interpolation module 66 may first calculate an average motor velocity before calculating a fine interpolated position based on a quantity of elapsed time, to be discussed in greater detail below. Alternative embodiments, however, may determine position using any feasible method.

The position interpolation module 66 passes a fine interpolated position signal to compensation module 68, which simultaneously receives a feedback position signal from position feedback module 70. The feedback position signal represents a count of the rising and falling edges of simulated encoder pulse output 62. Within compensation module 68, summer 72 subtracts the feedback position signal from the fine interpolated position signal to obtain a position error signal. The compensator 74 of compensation module 68 reads in the position error signal and outputs an error compensation value to computing unit 76, in order to maintain the position error signal to a value less than a predetermined integer. Accordingly, compensator 74 may be a proportional-integral (PI) controller, but may alternatively comprise any control loop feedback mechanism, such as a proportional-integral-derivative (PID) controller, to provide proper system adjustments.

Reading in position reference 58 and the error compensation value output by compensation module 68, computing unit 76 determines a quarter output period of the encoder pulse output. The quarter output period value is calculated to the nearest whole increment; increment duration must be a whole multiple of a system clock period (e.g., 50 ns). Computing unit 76 passes the quarter output period value to be loaded into a counter output unit 78. At a rising or falling edge of the simulated encoder pulse output 62, the counter output unit 78 counts down from the quarter output period value to zero. When the count reaches zero, an edge of the simulated encoder pulse output 62 rises or falls, as appropriate, and the counter output unit 78 obtains the next quarter output period value from computing unit 76. Accordingly, each countdown from quarter pulse width value to zero represents one quarter period of the simulated encoder pulse output 62.

Figure 5:
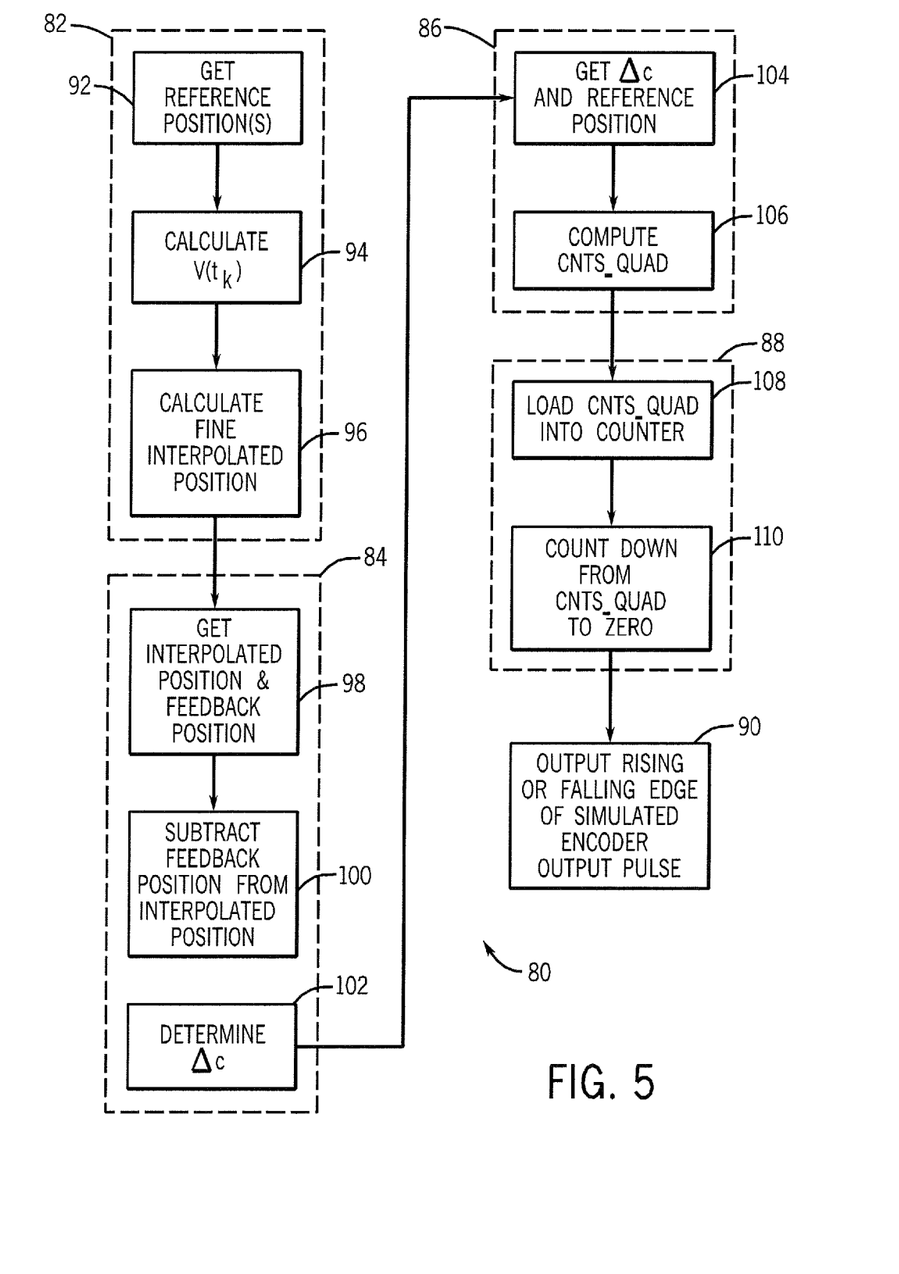
FIG. 5 is a flowchart illustrating an exemplary method of simulating an encoder pulse output in accordance with an embodiment of the invention.

Flowchart 80 of FIG. 5 illustrates an exemplary method of simulating an encoder pulse output as employed by encoder pulse output simulator 50. Block group 82 represents actions taken by position interpolation module 66, block group 84 represents actions taken by compensation module 68, block group 86 represents actions taken by computing unit 76, and block group 88 represents actions taken by counter 78. After all steps have been taken by block groups 82, 84, 86, and 88, step 90 represents the output signal.

Returning to the start of flowchart 80, position interpolation module 66 first obtains two reference positions during step 92. Each reference position represents the position of the motor one update interval ($T_k$) of time apart, $p(t_{k-1})$ and $p(t_k)$. Often the update interval $T_k$ may be very small (e.g., 250 µs). At step 92, an instantaneous velocity $v(t_k)$ is estimated according to the following equation:

$$v(t_k) \cong \frac{p(t_k) - p(t_{k-1})}{T_k}. \tag{1}$$

Having calculated $v(t_k)$, at step 96 the position interpolation module 66 calculates a fine interpolated position on the next rising or falling edge of the encoder pulse output signal, a moment of time referred to as $t_s$; the time between the most recent reference position update time $t_k$ and time $t_s$ is referred to as $\Delta t_s$. Accordingly, fine interpolated position $p_i(t_s)$ is calculated according to the following equation:

$$p_i(t_s) = p(t_k) + v(t_k) \cdot \Delta t_s \tag{2}.$$

After the fine interpolated position is calculated at step 96, the fine interpolated position signal passes to compensation module 68, which conducts the series of steps of block group 84. In step 98, compensation module 68 reads in both the fine interpolated position calculated in step 96 and a feedback position from position feedback module 70 representing the position signal of the simulated encoder output pulse. The summer 72 within compensation module 68 subtracts the feedback position $p_f(t_s)$ from the fine interpolated position $p_i(t_s)$ to obtain an error signal $\Delta p$:

$$\Delta p = p_i(t_s) - p_f(t_s) \tag{3}.$$

Continuing to step 102, compensator 74 then uses the error signal $\Delta p$ to output an error compensation value $\Delta c$ to computing unit 76 to maintain the position error signal to a value less than a predetermined integer. Accordingly, compensator 74 may be a proportional-integral (PI) controller, but may alternatively comprise any control loop feedback mechanism, such as a proportional-integral-derivative (PID) controller, to provide a proper error compensation value Δc.

In the first step 104 of block group 86, the computing unit 76 reads in both the error compensation value Δc and the current reference position $p(t_k)$, having previously obtain the prior reference position $p(t_{k-1})$. A required change of position Δy may be calculated as follows:

$$\Delta y = p(t_k) - p(t_{k-1}) + \Delta c \qquad (4).$$

Computing unit 76 next takes step 106, calculating a count value CNTS_quad, which represents the number of counts for a quarter output signal period. With $\Delta t_k$ representing the period of the reference position update interval $T_k$, $f_{clk}$ representing a system clock frequency (e.g., 20 MHz), and PPR representing the parameter of simulated pulses per revolution 60, CNTS_quad may be calculated according to the following equation:

$$\text{CNTS\_quad} = \frac{\Delta t_k}{\Delta y} \cdot \frac{f_{CLK}}{4 \cdot PPR}. \qquad (5)$$

Moving to block group 88, CNTS_quad is loaded into a counter 78 in step 108. The counter 78 counts down in step 110 from CNTS_quad to zero at a rate of one increment per count, where one increment equals one clock period (e.g., $1/f_{clk}$=50 ns). Accordingly, when the counter reaches zero and step 90 outputs the proximate rising or falling edge of the simulated encoder pulse output 62, exactly one quarter output period will have transpired.

Figure 6:
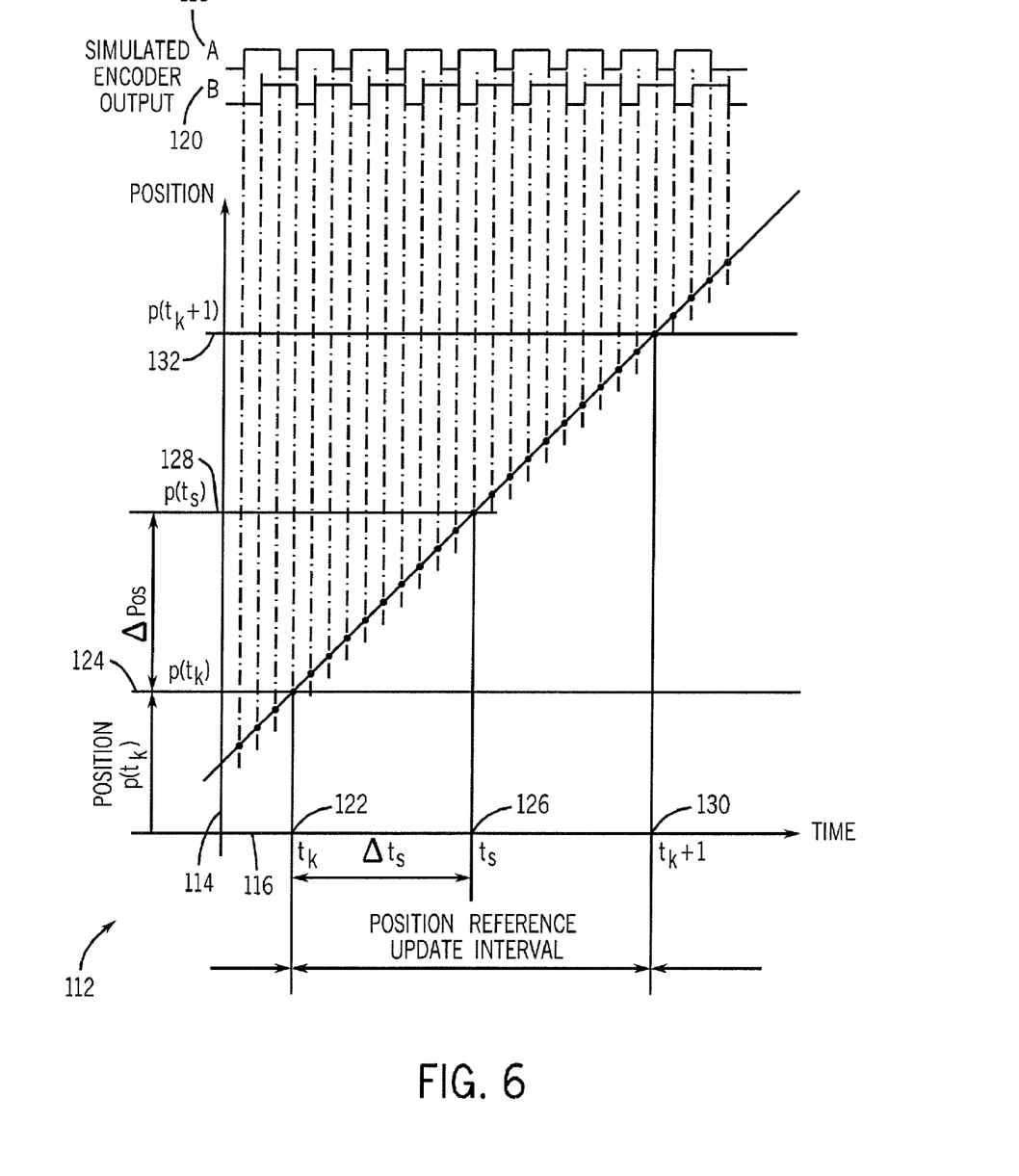
FIG. 6 is a graph representing the relationship between incremental position and time as pertaining to simulated encoder output pulse signals A and B.

A graph 112 of FIG. 6 represents the relationship between position and time and simulated encoder pulse output 62 signals A and B (Z is not depicted). Ordinate 114 represents relative motor position as a function of time, represented in abscissa 116. Simulated encoder output signals A 118 and B 120 appear above the graph 112 and relate to motor position as a function of time. Specifically, time $t_k$ 122 represents the time of the most recent reference position update, and $p(t_k)$ 124 represents the most recent reference position. The position interpolation module 66, as described above, estimates an instantaneous motor velocity, which appears in graph 112 as the slope of the position line. Time $t_s$ 126 represents the most recent rising or falling edge of either simulated encoder output signals A 118 or B 120, in this case the rising edge of B 120. At time $t_s$ 126, the position interpolation module 66 calculates a fine interpolation position $p(t_s)$ 128.

As discussed above, the fine interpolation position $p(t_s)$ 128 thereafter allows compensation module 68 to determine error compensation value Δc. With the error compensation value Δc, computing unit 76 may determine the quarter output period CNTS_quad and load the value into counter 78. As counter 78 counts down from CNTS_quad, the simulated encoder output signals either remain high or low, as appropriate, until the counter 78 reaches zero. Upon reaching zero, the next rising or falling edge of the simulated encoder output signals occurs on either A 118 or B 120, and a new fine interpolated position signal for a new time $t_s$ is again calculated, until time reaches $t_{k+1}$ 130. Time $t_{k+1}$ 130 represents the next reference update time, at which point the proximate reference position $p(t_{k+1})$ 132 update will occur.

Because CNTS_quad represents an integer number of increments in a quarter output period, CNTS_quad may be slightly greater or slightly less than the ideal interpolated position would indicate. If CNTS_quad were calculated only once between reference position update times $t_k$ 122 and $t_{k+1}$ 130, small errors in quarter output period could accumulate into a substantial total error by time $t_{k+1}$ 130. However, compensation module 68 continually determines a closed loop error compensation value Δc, enabling computing unit 76 to adjust CNTS_quad accordingly and often between reference position update times. Accordingly, unless the motor velocity has altered since the prior reference position update time $t_k$ 122, reference position $p(t_{k+1})$ 132 should fall appropriately along the slope of the line.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for generating simulated encoder outputs in a control system comprising:
   computing an output pulse width between reference position inputs, the output pulse width being based upon a difference between an updated reference position input and a previous reference position input, and upon a time interval between the reference position inputs;
   outputting a plurality of simulated encoder pulses between updates of the reference position input based upon the computed output pulse width; and
   adjusting the output pulse width in a closed loop manner between updates of the reference position input.

2. The method of claim 1, wherein the output pulse width is computed based upon a processor clock frequency and a desired number of pulses per revolution of a motor system.

3. The method of claim 1, wherein adjusting the output pulse width further comprises adding or subtracting a position error value from the output pulse width.

4. The method of claim 3, wherein the position error value is determined at approximately each rising or falling edge of the plurality of simulated encoder pulses.

5. The method of claim 3, wherein the position error value is calculated by subtracting an output position value, based on at least one of the plurality of simulated encoder pulses, from an interpolated position value, based on the updated reference position input and the previous reference position input and a quantity of time elapsed since the updated reference position input was obtained.

6. A method for generating a simulated encoder output in a motor control system comprising:
   reading in a first reference position value corresponding to a first time value;
   reading in a second reference position value corresponding to a second time value; and
   determining an output pulse width based on a rate of change corresponding to a difference between the first reference position value and the second reference divided by a difference between the first time value and the second time value; and
   outputting a plurality of simulated encoder pulses with pulse width equal to the output pulse width.

7. The method of claim 6, wherein determining an output pulse width further comprises adding to or subtracting from the output pulse width according to a closed loop manner of correction.

8. The method of claim 6, wherein determining the output pulse width further comprises extrapolating from the rate of change a future position value corresponding to a future time value beyond the second reference position and later than the second time value.

9. The method of claim 6, wherein determining the output pulse width further comprises shortening the output pulse width to a duration of integer increments.

10. The method of claim 9, wherein each of the duration of integer increments is equal to one system clock period.

11. A method of simulating an incremental encoder pulse output comprising:
   receiving an initial digital incremental encoder reference position at an initial time;
   receiving an updated digital incremental encoder reference position at a time equal to one update interval after the initial time;
   interpolating an estimated incremental position based on a rate of change between the initial digital incremental encoder reference position and the updated digital incremental encoder reference position;
   computing an adjusted estimated incremental position by adding or subtracting a difference between the estimated incremental position and an incremental position indicated by a rising or falling edge of an incremental encoder output pulse;
   computing an output pulse width based on the adjusted estimated incremental position; and
   outputting the incremental encoder output pulse based on the output pulse width.

12. The method of claim 11, wherein the initial digital incremental encoder reference position and the updated digital incremental encoder reference position arise from a virtual digital encoder.

13. The method of claim 11, wherein computing an adjusted estimated incremental position by adding or subtracting a difference between the estimated incremental position and the incremental position indicated by a rising or falling edge of the incremental encoder output pulse initially comprises receiving the incremental encoder output pulse as closed loop feedback.

14. The method of claim 11, wherein outputting the incremental encoder output pulse comprises outputting the incremental encoder output pulse for a lowest integer number of increments of duration.

15. The method of claim 14, wherein each of the increments of duration is one system clock period.

* * * * *